(12) United States Patent
Lyubimov et al.

(10) Patent No.: US 10,860,588 B2
(45) Date of Patent: Dec. 8, 2020

(54) METHOD AND COMPUTER DEVICE FOR DETERMINING AN INTENT ASSOCIATED WITH A QUERY FOR GENERATING AN INTENT-SPECIFIC RESPONSE

(71) Applicant: YANDEX EUROPE AG, Lucerne (CH)

(72) Inventors: Nikolay Andreevich Lyubimov, Moscow (RU); Boris Konstantinovich Yangel, Nalchik (RU)

(73) Assignee: YANDEX EUROPE AG, Lucerne (CH)

( * ) Notice: Subject to any disclaimer, the term of this patent is extended or adjusted under 35 U.S.C. 154(b) by 344 days.

(21) Appl. No.: 16/022,882

(22) Filed: Jun. 29, 2018

(65) Prior Publication Data

US 2019/0197165 A1    Jun. 27, 2019

(30) Foreign Application Priority Data

Dec. 27, 2017 (RU) .................................. 2017146280

(51) Int. Cl.
*G06F 16/00* (2019.01)
*G06F 16/2457* (2019.01)
(Continued)

(52) U.S. Cl.
CPC .. *G06F 16/24575* (2019.01); *G06F 16/24578* (2019.01); *G06F 16/90324* (2019.01);
(Continued)

(58) Field of Classification Search
None
See application file for complete search history.

(56) References Cited

U.S. PATENT DOCUMENTS 5,712,957 A    1/1998 Waibel et al.
6,701,294 B1   3/2004 Ball et al.
(Continued)

FOREIGN PATENT DOCUMENTS

RU    2419858 C2    5/2011
RU    2427044 C1    8/2011

OTHER PUBLICATIONS

Search Report with regard to the counterpart RU Patent Application No. 2017146889 completed Apr. 18, 2019.
(Continued)

*Primary Examiner* — Son T Hoang
(74) *Attorney, Agent, or Firm* — BCF LLP

(57) ABSTRACT

A user is associated with the current and preceding query that is associated with a preceding intent. The method comprises: receiving the current query and preceding intent; determining a respective intent-association parameter for each one of the plurality of potential intents based on the current query; determining a respective intent-transition parameter for each one of the plurality of potential intents; determining a respective adjusted intent-association parameter for each one of the plurality of potential intents as a multiplication of the respective intent-association parameter and the respective intent-transition parameter; and selecting one of the plurality of potential intents as the current intent based on the adjusted intent-association parameters.

20 Claims, 8 Drawing Sheets

(51) Int. Cl.
*G06F 16/9032* (2019.01)
*G06N 20/20* (2019.01)
*G06N 5/02* (2006.01)
*G06N 5/00* (2006.01)

(52) U.S. Cl.
CPC .............. *G06N 5/022* (2013.01); *G06N 20/20* (2019.01); *G06N 5/003* (2013.01)

(56) References Cited

U.S. PATENT DOCUMENTS

| | | | |
|---|---|---|---|
| 8,140,335 | B2 | 3/2012 | Kennewick et al. |
| 8,239,370 | B2* | 8/2012 | Wong .................. G06F 16/9535 707/713 |
| 8,688,667 | B1* | 4/2014 | Kurzion .............. G06F 16/9535 707/705 |
| 8,914,277 | B1 | 12/2014 | Liu |
| 8,935,163 | B2 | 1/2015 | Huang et al. |
| 9,165,028 | B1* | 10/2015 | Christensen ........ G06F 16/3338 |
| 9,342,626 | B1* | 5/2016 | Das ..................... G06F 16/9535 |
| 9,961,200 | B1* | 5/2018 | Kothuvatiparambil ...................... G06F 16/907 |
| 2010/0036667 | A1 | 2/2010 | Byford et al. |
| 2010/0306191 | A1 | 12/2010 | Lebeau et al. |
| 2011/0208730 | A1* | 8/2011 | Jiang ..................... G06F 16/951 707/727 |
| 2011/0314026 | A1 | 12/2011 | Pickens et al. |
| 2014/0330818 | A1* | 11/2014 | Raina ............... G06F 16/24578 707/723 |
| 2015/0012829 | A1 | 1/2015 | Brown et al. |
| 2015/0127327 | A1 | 5/2015 | Bacchiani et al. |
| 2015/0278358 | A1 | 10/2015 | Abib et al. |
| 2016/0078087 | A1* | 3/2016 | Wang ..................... G06F 40/30 707/706 |
| 2017/0032035 | A1 | 2/2017 | Gao et al. |
| 2017/0124447 | A1 | 5/2017 | Chang et al. |
| 2017/0140755 | A1 | 5/2017 | Andreas et al. |
| 2018/0107933 | A1* | 4/2018 | Wang .................... G06N 7/005 |
| 2018/0232376 | A1 | 8/2018 | Zhu et al. |

OTHER PUBLICATIONS

Search Report with regard to the counterpart RU Patent Application No. 2017146280 completed Oct. 28, 2019.
Song et al., "Two are Better than One: An Ensemble of Retrieval- and Generation-Based Dialog Systems", Peking University, China, 2016, p. 1-11.
Vergnes, "Interactive Assistant for Activities of Daily Living", IOS Press, Canada, 2003, p. p. 1-8.
Sundblad et al., "OLGA—a Multimodal Interactive Information Assistant", CID—Center for User Oriented IT Design, Sweden, 2 pages, bladhttps://www.semanticscholar.org/paper/OLGA-a-multimodal-interactive-information-assistant-Sundblad-Sundblad/6f9c6b7e09947c34ae54fcc29b38d96a71acc7c5.
Notice of Allowance with regard to the counterpart U.S. Appl. No. 16/031,887 dated Apr. 13, 2020.
He et al., "Learning from Imbalanced Data", IEEE Transactions on Knowledge and Data Engineering, 2009, vol. 21, No. 9, pp. 1263-1284.
Frankle et al., "The Lottery Ticket Hypothesis: Training Pruned Neural Network Architectures", 2018, arXiv.org > cs > arXiv: 1803.03635v2, pp. 1-21.
Sultan et al., "DLS@CU: Sentence Similarity from Word Alignment and Semantic Vector Composition", Proceedings of the 9th International Workshop on Semantic Evaluation (SemEval), 2015, pp. 148-153.

* cited by examiner

US 10,860,588 B2

METHOD AND COMPUTER DEVICE FOR DETERMINING AN INTENT ASSOCIATED WITH A QUERY FOR GENERATING AN INTENT-SPECIFIC RESPONSE

CROSS-REFERENCE

The present application claims priority to Russian Patent Application No. 2017146280, entitled "Method And Computer Device For Determining An Intent Associated With A Query For Generating An Intent-Specific Response", filed Dec. 27, 2017, the entirety of which is incorporated herein by reference.

FIELD

The present technology relates to intelligent personal assistant systems and, more particularly, to a method and computer device for determining an intent of a query for generating an intent-specific response.

BACKGROUND

Electronic devices, such as smartphones and tablets, are able to access an increasing and diverse number of applications and services for processing and/or accessing different types of information. However, novice users and/or impaired users and/or users operating a vehicle may not be able to effectively interface with such devices mainly due to the variety of functions provided by these devices or the inability to use the machine-user interfaces provided by such devices (such as a key board). For example, a user who is driving or a user who is visually-impaired may not be able to use the touch screen key board associated with some of these devices.

Intelligent Personal Assistant (IPA) systems have been developed to perform functions in response to user requests. Such IPA systems may be used, for example, for information retrieval and navigation. A conventional IPA system, such as Ski® IPA system for example, can accept simple human natural language inputs from a device and perform a large variety of tasks for the user. For example, a user can communicate with Ski® IPA system by providing spoken utterances (through Siri®'s voice interface) for asking, for example, what the current weather is, where the nearest shopping mall is, and the like. The user can also ask for execution of various applications installed on the electronic device.

Conventional IPA systems are focused on analyzing a user request and providing an appropriate response therefor. However, providing an appropriate response based on a request may be a difficult task due to a large semantical variety of user requests, which makes it hard to determine the meaning of the requests.

SUMMARY

Developers of the present technology have appreciated certain technical drawbacks associated with the existing IPA systems. Conventional IPA systems are focused on analyzing a given query for determining the meaning thereof or user intent associated therewith. Such analysis is appropriate for queries that are explicitly indicative of the user's intent. For example, a query such as "What is the weather in Paris today?" explicitly indicates that the user intends to request weather information for a specific location and for a specific time. However, such analysis may not be appropriate if the given query is an intent-dependent query. For example, a query such as "And in London?" does not explicitly indicate that the user intends to request weather information for a specific location or for specific time for that matter. Indeed, the intent of this query is implicit and depends on the intent of a previous query submitted by the user. In other words, this type of queries can be thought of as "follow up queries". Therefore, by analyzing solely a given query for determining its meaning or intent may not be sufficient.

It is an object of the present technology to ameliorate at least some of the inconveniences present in the prior art. Developers of the present technology envisaged a system that takes into account previous intents associated with previous queries in order to determine the meaning or the current intents of current queries. It is contemplated that the current intent is at least partially based on the current query and a probability of the user changing a previous intent to the current intent.

In accordance with a first broad aspect of the present technology, there is provided a method of determining a current intent associated with a current query of a user for generating an intent-specific response associated with the current intent for the current query. The user is associated with the current query and a preceding query. The preceding query is associated with a preceding intent. The current and preceding intents are amongst a plurality of potential intents, The method executable by a server. The method comprises receiving, by the server, the current query and the preceding intent. The method comprises determining, by the server, a respective intent-association parameter for each one of the plurality of potential intents based on the current query where a given intent-association parameter is indicative of a probability of the current query being associated with a respective one of the plurality of potential intents. The method comprises determining, by the server, a respective intent-transition parameter for each one of the plurality of potential intents where a given intent-transition parameter is indicative of a probability of a change of the preceding intent to the respective one of the plurality of potential intents. The method comprises determining, by the server, a respective adjusted intent-association parameter for each one of the plurality of potential intents as a multiplication of the respective intent-association parameter and the respective intent-transition parameter. The method comprises selecting, by the server, one of the plurality of potential intents as the current intent based on the adjusted intent-association parameters.

In some embodiments of the method, the determining the intent-association parameters may be executed by a first machine learning algorithm (MLA) having been trained: based on (i) past queries and (ii) respectively associated potential intents; and for determining the probability of a given query to be associated with a given one of the plurality of potential intents. Each one of the past queries may have been associated with a given one of the plurality of potential intents by a human-assessor.

In some embodiments of the method, the determining the intent-transition parameters may be executed by a heuristic-based routine. A plurality of rules to be used by the heuristic-based routine may have been pre-determined by an operator.

In some embodiments of the method, the determining the intent-transition parameters may be executed by a second MLA having been trained: based on (i) pairs of consecutive past queries and (ii) pairs of consecutive potential intents respectively associated with the pairs of consecutive past queries; and for determining the probability of the change from (i) a first one of a given pair of consecutive potential intents of a first one of a respective pair of consecutive queries to (ii) a second one of the given pair of consecutive potential intents of a second one of a respective pair of consecutive queries. Each pair of consecutive potential intents may have been associated with the respective pair of consecutive past queries by the human-assessor.

In some embodiments of the method, the method may further comprise generating, by the server, a ranked plurality of potential intents comprising each one of the plurality of potential intents ranked based on the respective adjusted intent-association parameter. The selecting the one of the plurality of potential intent as the current intent may comprise selecting, by the server, a top ranked potential intent in the ranked plurality of potential intents as the current intent.

In some embodiments of the method, the method may further comprise comparing, by the server, each adjusted intent-association parameter with an association-significance threshold. The association-significance threshold may have been determined by an operator of the server. In response to each adjusted intent-association parameter being below the association-significance threshold, the method may comprise generating, by the server, a fallback response for the current query instead of the intent-specific response.

In some embodiments of the method, each of the plurality of potential intents may be associated with a respective digital-form for generating a respective intent-specific response associated with the respective potential intent. Each digital-form may comprise form-fields associated with respective field-parameters.

In some embodiments of the method, the method may further comprise associating, by the server, a given form-value from the current query with a given form-field of a given digital-form. The given digital-form may be associated with the current intent.

In some embodiments of the method, the given digital-form may comprise at least one mandatory form-field associated with a respective field-parameter. The respective intent-specific response may be generated only if all of the at least one mandatory form-fields are associated with respective form-values.

In some embodiments of the method, the associating the given form-value may be executed by a third MLA having been trained: based on (i) field-parameters of form-fields of the digital-forms, (ii) the past queries and (iii) form-values from the past queries associated with the field-parameters; and for associating form-values from queries with field-parameters of digital-forms. The form-values from the past queries have been associated with the field-parameters of the digital-forms by the human-assessor.

In some embodiments of the method, at least one of the current query and the preceding query may be generated, by a natural language user interface of an intelligent personal assistant (IPA) application, based on spoken utterances of the user.

In some embodiments of the method, the intent-specific response may be a spoken utterance for the user generated by a natural language user interface of an intelligent personal assistant (IPA) application.

In accordance with a second broad aspect of the present technology, there is provided a computer device for determining a current intent associated with a current query of a user for generating an intent-specific response associated with the current intent for the current query. The user is associated with the current query and a preceding query. The preceding query is associated with a preceding intent. The current and preceding intents are amongst a plurality of potential intents. The computer device is configured to receive the current query and the preceding intent. The computer device is configured to determine a respective intent-association parameter for each one of the plurality of potential intents based on the current query. A given intent-association parameter is indicative of a probability of the current query being associated with a respective one of the plurality of potential intents. The computer device is configured to determine a respective intent-transition parameter for each one of the plurality of potential intents. A given intent-transition parameter being indicative of a probability of a change of the preceding intent to the respective one of the plurality of potential intents. The computer device is configured to determine a respective adjusted intent-association parameter for each one of the plurality of potential intents as a multiplication of the respective intent-association parameter and the respective intent-transition parameter. The computer device is configured to select one of the plurality of potential intents as the current intent based on the adjusted intent-association parameters.

In some embodiments of the computer device, the computer device may be an electronic device associated with the user.

In some embodiments of the computer device, the computer device may be a server hosting an intelligent personal assistant (IPA) application.

In some embodiments of the computer device, the computer device may be configured to determine the intent-association parameters by executing a first machine learning algorithm (MLA) having been trained: based on (i) past queries and (ii) respectively associated potential intents; and for determining the probability of a given query to be associated with a given one of the plurality of potential intents. Each one of the past queries may have been associated with a given one of the plurality of potential intents by a human-assessor.

In some embodiments of the computer device, the computer device may be configured to determine the intent-transition parameters by executing a heuristic-based routine. A plurality of rules to be used by the heuristic-based routine may have been pre-determined by an operator.

In some embodiments of the computer device, the computer device may be configured to determine the intent-transition parameters by executing a second MLA having been trained: based on (i) pairs of consecutive past queries and (ii) pairs of consecutive potential intents respectively associated with the pairs of consecutive past queries; and for determining the probability of the change from (i) a first one of a given pair of consecutive potential intents of a first one of a respective pair of consecutive queries to (ii) a second one of the given pair of consecutive potential intents of a second one of a respective pair of consecutive queries. Each pair of consecutive potential intents may have been associated with the respective pair of consecutive past queries by the human-assessor.

In some embodiments of the computer device, the computer device may be further configured to generate a ranked plurality of potential intents comprising each one of the plurality of potential intents ranked based on the respective adjusted intent-association parameter. The computer device configured to select the one of the plurality of potential intent as the current intent may comprise the computer device configured to select a top ranked potential intent in the ranked plurality of potential intents as the current intent.

In some embodiments of the computer device, the computer device may be further configured to compare each adjusted intent-association parameter with an association-significance threshold. The association-significance threshold may have been determined by an operator of the server. In response to each adjusted intent-association parameter being below the association-significance threshold, the computer device may be further configured to generate a fallback response for the current query instead of the intent-specific response.

In some embodiments of the computer device, each of the plurality of potential intents may be associated with a respective digital-form for generating a respective intent-specific response associated with the respective potential intent. Each digital-form may comprise form-fields associated with respective field-parameters.

In some embodiments of the computer device, the computer device may be further configured to associate a given form-value from the current query with a given form-field of a given digital-form, the given digital-form being associated with the current intent.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
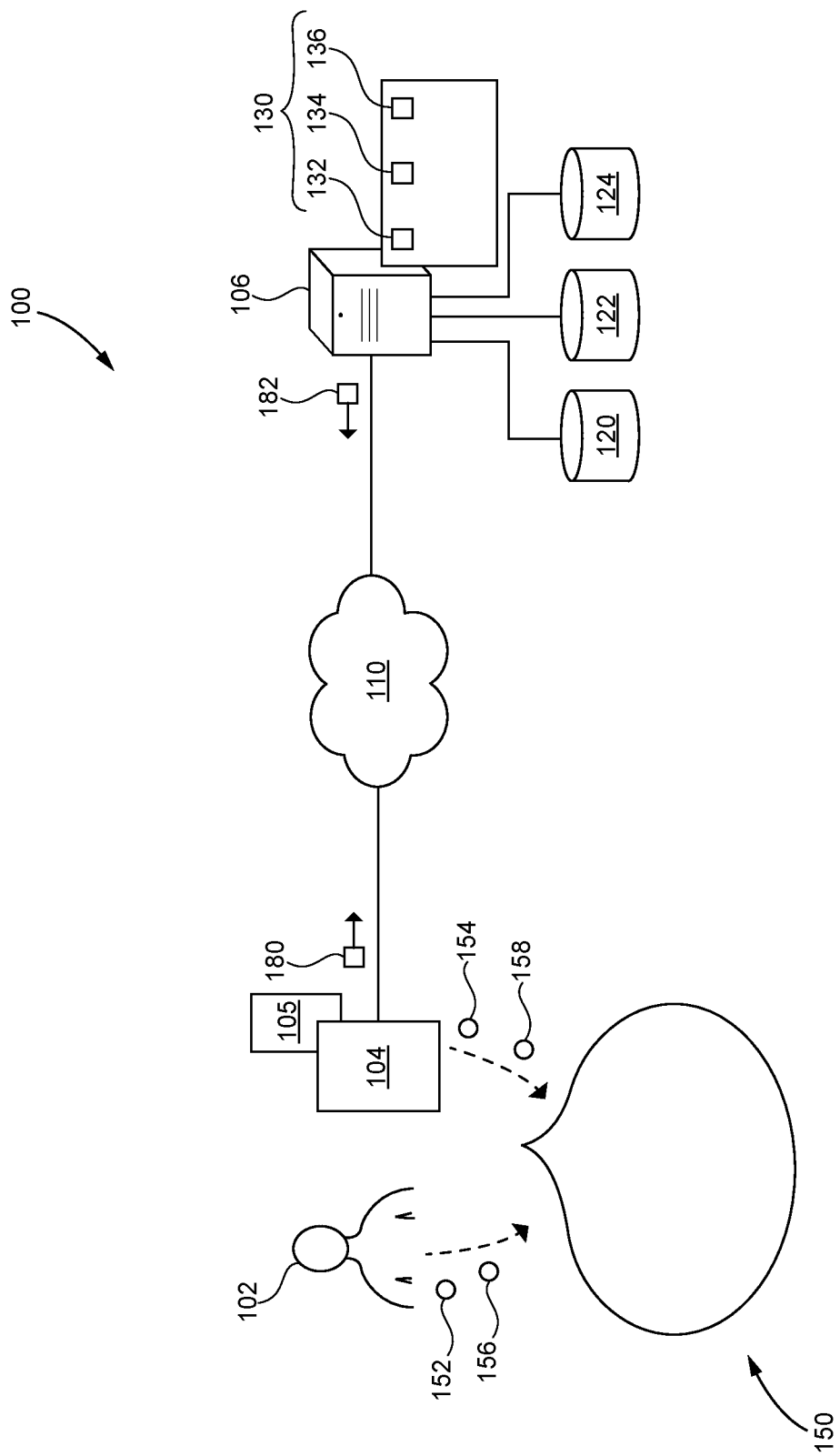
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology.

These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide intent-specific responses to user queries, which can be said to result in a "conversation" between a given user and a given electronic device. For example, sound indications 152 and 156 (such as spoken utterances) from a user 102 may be detected by an electronic device 104 (or simply a "device 104"), which, in response, is configured to provide sound indications 154 and 158 (such as spoken utterances or "machine generated utterances"). As such, it can be said that this results in a conversation 150 between the user 102 and the device 104, where the conversation 150 is composed of (i) the sound indications 152 and 156 and (ii) the sound indications 154 and 158.

Various components of the system 100 and how these components may be configured for implementing the provision of the sound indications 154 and 158 will now be described.

User Device

As previously mentioned, the system 100 comprises the device 104. The implementation of the device 104 is not particularly limited, but as an example, the device 104 may be implemented as a personal computer (desktops, laptops, netbooks, etc.), a wireless communication device (such as a smartphone, a cell phone, a tablet, a smart speaker and the like), as well as network equipment (such as routers, switches, and gateways). As such, the device 104 can sometimes be referred to as an "electronic device", "end user device", "client electronic device" or simply "device". It should be noted that the fact that the device 104 is associated with the user 102 does not need to suggest or imply any mode of operation—such as a need to log in, a need to be registered, or the like.

It is contemplated that the device 104 comprises hardware and/or software and/or firmware (or a combination thereof), as is known in the art, in order to (i) detect or capture the sound indications 152 and 156 and (ii) to provide or reproduce the sound indications 154 and 158. For example, the device 104 may comprise one or more microphones for detecting or capturing the sound indications 152 and 156 and one or more speakers for providing or reproducing the sound indications 154 and 158.

The device 104 also comprises hardware and/or software and/or firmware (or a combination thereof), as is known in the art, in order to execute an intelligent personal assistant (IPA) application 105. Generally speaking, the purpose of the IPA application 105, also known as a "chatbot", is to (i) enable the user 102 to submit queries in a form of spoken utterances (e.g., the sound indications 152 and 156) and, in response, (ii) provide to the user 102 intent-specific responses in a form of spoken utterances (e.g., the sound indications 154 and 158). Submission of queries and provision of intent-specific responses may be executed by the IPA application 105 via a natural language user interface.

Generally speaking, the natural language user interface of the IPA application 105 may be any type of computer-human interface where linguistic phenomena such as verbs, phrases, clauses and the like act as user interface controls for extracting, selecting, modifying or otherwise generating data in the IPA application 105.

For example, when spoken utterances of the user 102 (e.g., the sound indications 152 and 156) are detected (i.e. captured) by the device 104, the IPA application 105 may employ its natural language user interface in order to analyze the spoken utterances of the user 102 and extract data therefrom which is indicative of queries of the user 102. Also, data indicative of intent-specific responses, which may be received by the device 104, is analyzed by the natural language user interface of the IPA application 105 in order to provide or reproduce spoken utterances (e.g., the sound indications 154 and 158) indicative of the intent-specific responses.

Alternatively or additionally, it is contemplated that the IPA application 105 may employ a text-based computer-human interface for (i) enabling the user 102 to submit indications of queries in a text-based form and, in response, (ii) providing the user 102 with indications of intent-specific responses in a text-based form.

Communication Network

In the illustrative example of the system 100, the device 104 is communicatively coupled to a communication network 110 for accessing and transmitting data packets to/from a server 112 and/or other web resources (not depicted). In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the device 104 and the communication network 110 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

Server

As previously mentioned, the system 100 also comprises the server 106 that can be implemented as a conventional computer server. In an example of an embodiment of the present technology, the server 106 can be implemented as a Dell™ PowerEdgeT™ Server running the Microsoft™ Windows Server™ operating system. Needless to say, the server 106 can be implemented in any other suitable hardware, software, and/or firmware, or a combination thereof. In the depicted non-limiting embodiments of the present technology, the server 106 is a single server. In alternative non-limiting embodiments of the present technology, the functionality of the server 106 may be distributed and may be implemented via multiple servers.

Generally speaking, the server 106 is configured to (i) receive data indicative of queries from the device 104, (ii) analyze the data indicative of queries and, in response, (iii) generate data indicative of intent-specific responses and (iv) transmit the data indicative of intent-specific responses to the device 104. To that end, the server 106 hosts an IPA service 108 associated with the IPA application 105.

In some embodiments of the present technology, the IPA service 108 is configured to analyze data indicative of queries received from the device 104 (and potentially of other devices of the system 100) for determining intents of these queries.

For example, let it be assumed that the data received from the device 104 is indicative of a first query "What is the weather in Moscow?". It is noted that in this example, the first query explicitly refers to weather in a specific location. As such, the IPA service 108 may be configured to analyze this data and determine that the intent of the first query is "weather".

In another example, let it be assumed that, after (i) receiving the data indicative of the first query and (ii) determining the intent of the first query, other data is received from the device 104 that is indicative of a second query "What's it like in Montreal?". Although the second query seems to be referring to a travel destination and, thus, seems to be associated with the intent "travel", in some embodiments of the present technology, the IPA service 108 may be configured to analyze both (i) the data indicative of the first query and (ii) the other data indicative of the second query, and determine that the intent of the second user query is also "weather". It should be noted that, although the second query does not explicitly refer to weather, it is contemplated that the IPA service 108 may be configured to determine the intent of the second query at least partially based on the intent of the first query previously determined by the IPA service 108.

In other embodiments of the present technology, the IPA service 108 is configured to generate, for queries, intent-specific responses at least partially based on intents of queries.

For example, after determining that the intent of the first query "What is the weather in Moscow?" is "weather", the IPA service 108 may be configured to generate a first intent-specific response at least partially based on (i) the first query and (ii) the intent of the first query. As such, the IPA service 108 may be configured to generate the first intent-specific response "The temperature in Moscow is -7 degrees Celsius and it is snowing".

In another example, after determining that the intent of the second user query "What's it like in Montreal?" is also "weather", the IPA service 108 may be configured to generate a second intent-specific response at least partially based on (i) the second query and (ii) the intent of the second query. As such, the IPA service 108 may be configured to generate the second intent-specific response "The temperature in Montreal is -15 degrees Celsius and it is sunny". It should be noted that, instead of providing a response relating to travel information about the city of Montreal in response to the second query, the IPA service 108 may configured to generate the second intent-specific response that is specific to the intent "weather".

The IPA service 108 comprises various components that may allow implementing the above-mentioned functionalities thereof. For example, the IPA service 108 may implement, inter alia, a plurality of machine learning algorithms (MLAs) 130 comprising a first, a second, and a third MLA 132, 134 and 136 for implementing at least some of the above-mentioned functionalities of the IPA service 108.

Generally speaking, a given MLA is a computer-based algorithm that can "learn" from training data and make predictions based on in-use data. A given MLA is usually trained, during a training phase thereof, based on the training data to, in a sense, "learn" associations and/or patterns in the training data for making predictions, during an in-use phase thereof, based on the in-use data. In some embodiments of the present technology, each one of the plurality of MLAs 130 may be implemented as a decision tree model which makes predictions by following a given "branch" thereof based on in-use data as input in order to select a given "leaf" thereof as an output. How the plurality of MLAs 130 and other components of the IPA service 108 are implemented, trained and used for implementing at least some of the above-mentioned functionalities of the IPA service 108 will be described in greater detail further below.

The server 112 is also communicatively coupled to a development database 120, a training database 122, and a processing database 124. In the depicted illustration, the development database 120, the training database 122 and the processing database 124 are depicted as separate physical entities. This does not need to be so in each and every embodiment of the present technology. As such, some or all of the development database 120, the training database 122 and the processing database 124 may be implemented in a single database. Furthermore, any one of the development database 120, the training database 122 and the processing database 124 may, in itself, be split into several distributed storages. By the same token, all (or any combination of) the development database 120, the training database 122 and the processing database 124 may be implemented in a single hardware apparatus.

Development Database

Generally speaking, the development database 120 is configured to store application data that may be used by the IPA service 108 during (i) analysis of data indicative of queries, (ii) determination of intents of queries and (iii) generation of intent-specific responses for queries.

The development database 120 may be populated by developers of the IPA service 108 and/or by an operator of the server 106. For example, the development database 120 may be populated with and store a list of all potential intents that may be associated with a given query. In another example, the development database 120 may be populated with and store sets of program code instructions that, when executed, may allow implementing at least some functionalities of the IPA service 108. How the list of potential intents and the sets of program code instructions may allow implementing at least some functionalities of the IPA service 108 will become apparent in view of the description below.

Training Database

Generally speaking, the training database 122 is configured to store training data that may be used during training phases of the plurality of MLAs 130 implemented by the IPA service 108. The server 106 may be configured to make use of historical information collected from (i) a large number of past queries and (ii) a large number of past responses for these past queries for training the plurality of MLAs 130. Put another way, the training database 122 may comprise one or more collections of data relating to past queries that are associated with the user 102 (and potentially other users) and past responses provided for these past queries.

In addition, the training database 122 may be configured to store human-assessed information that is associated with the one or more collections of data relating to the past queries and the past responses. For example, the human-assessed information may be provided by one or more human-assessors that are tasked with analyzing the one or more collections of data relating to the past queries and the past responses. It is contemplated that the server 106 may also make use of the human-assessed information for training the plurality of MLAs 130. How the training data is structured and used by the server 106 for training the plurality of MLAs 130 will be described in greater detail further below.

Processing Database

The processing database 124 is configured to store information extracted or otherwise determined or generated by the server 106 during processing. Generally speaking, the processing database 124 may receive data from the server 106 which was extracted or otherwise determined or generated by the server 106 during processing for temporary and/or permanent storage thereof and may provide stored data to the server 106 for use thereof.

How at least some of the above-mentioned functionalities of the IPA service 108 may be implemented will now be described.

Let it be assumed that the sound indication 152 (e.g., a spoken utterance of the user 102) is detected or captured by the device 104. The IPA application 105 extracts, from the sound indication 152, the data indicative of the first query "What is the weather in Moscow?". The data indicative of the first query is transmitted to the server 106 where the IPA service 108 determines that the intent of the first query is "weather". It is contemplated that the data indicative of the first query may be stored in the processing database 124 in association with the intent thereof determined by the IPA service 108.

Let it also be assumed that the IPA service 108 generates the first intent-specific response "The temperature in Moscow is −7 degrees Celsius and it is snowing." at least partially based on (i) the first query and (ii) the intent of the first query. The server 106 then transmits to the device 104 the data indicative of the first intent-specific response. It is contemplated that the data indicative of the first intent-specific response may be stored in the processing database 124 in association with the first query and the intent thereof.

Let is also be assumed that the device 104 generates, based on the data indicative of the first intent-specific response, the sound indication 154 (e.g., a "spoken utterance" of the IPA application 105) and provides or reproduces it for the user 102.

Let it also be assumed that the sound indication 156 (e.g., another spoken utterance of the user 102) is then detected or captured by the device 104. The IPA application 105 extracts, from the sound indication 156, the data indicative of the second query "What's it like in Montreal?". Put another way, the conversation 150 may be as follows:

"What is the weather in Moscow?"

"The temperature in Moscow is −7 degrees Celsius and it is snowing."

"What's it like in Montreal?"

The device 104 may be configured to generate a data packet 180 which comprises data indicative of the second query "What's it like in Montreal?". In some embodiments, the data packet 180 may comprise data indicative of the conversation 150, such as data indicative of (i) the first query, (ii) the first intent-specific response and (iii) the second query. In yet another embodiment, the data packet 180 may further comprise data indicative of the intent of the first query (e.g., "weather"). The device 104 is configured to transmit the data packet 180 via the communication network 110 to the server 106. It is contemplated that the content of the data packet 180 may be stored in the processing database 124 by the server 106 upon reception thereof.

Upon receiving the data packet 180, the server 106 may transmit its content to the IPA service 108 for processing. Generally speaking, the IPA service 108 is configured to generate, based on at least some content of the data packet 180, a given intent-specific response for the second query.

In some embodiments, during processing of the content of the data packet 180, the IPA service 108 may be configured to analyze the content of the data packet 180 in order to determine (i) a current query for which it is to generate a current intent-specific response, (ii) a preceding query which precedes the current query in the conversation 150 and (iii) the intent of the preceding query. As such, the IPA service 108 may determine that (i) the current query for which it is to generate the current intent-specific response is the second query "What's it like in Montreal?", (ii) the preceding query which precedes the current query in the conversation 150 is the first query "What is the weather in Moscow?" and (iii) the intent of the preceding query is "weather".

It is contemplated that the IPA service 108 may make use of the application data stored in the development database 120 for generating the current intent-specific response for the current query "What's it like in Montreal?".

Figure 2:
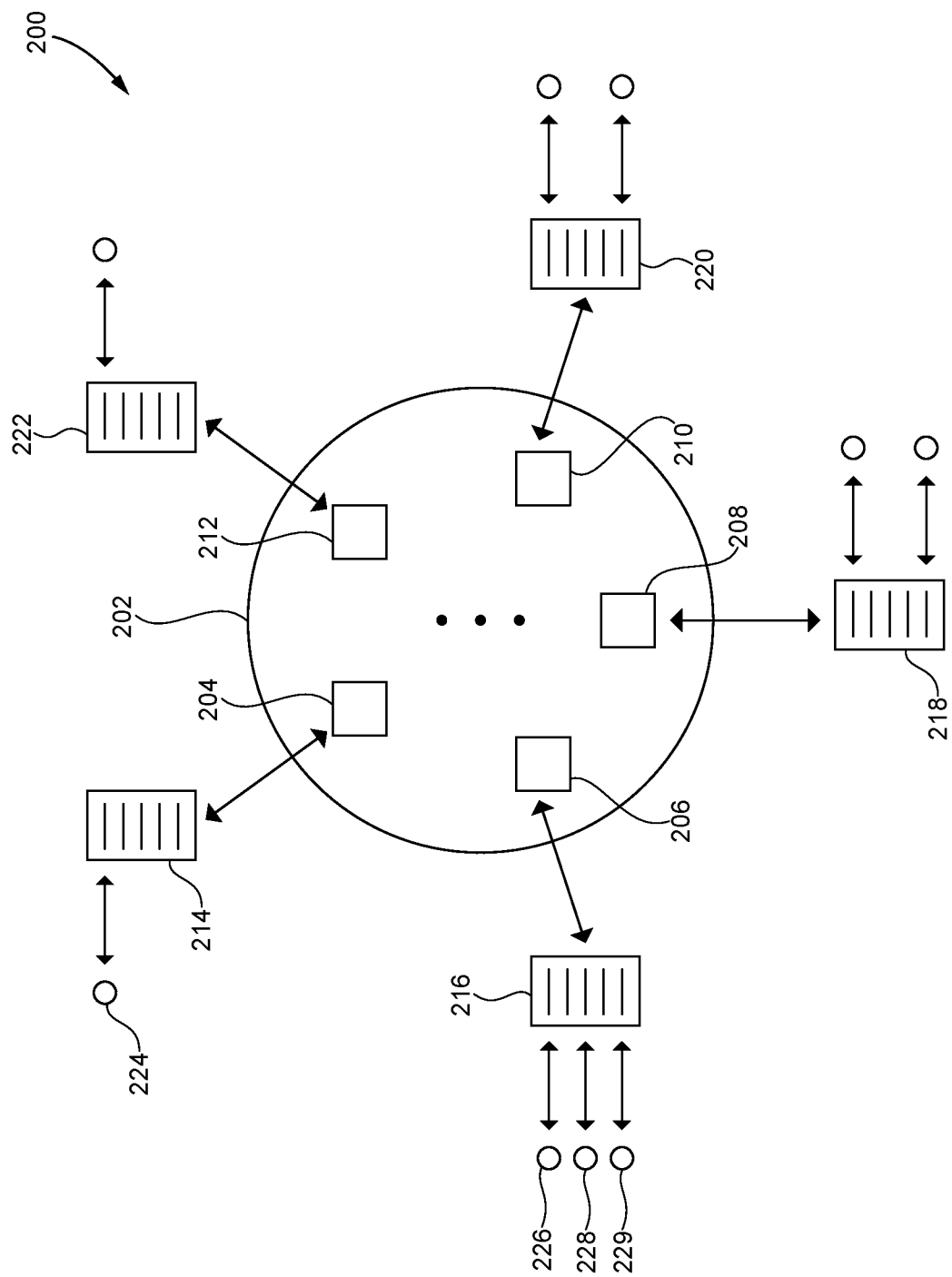
FIG. 2 depicts an illustrative example of application data stored in a development database of the system of FIG. 1 according to some embodiments of the present technology.

With reference to FIG. 2, there is depicted an illustrative example of application data 200 stored in the development database 120. The application data 200 comprises a plurality of potential intents 202. As previously mentioned, the plurality of potential intents 202 may be determined by the developers of the IPA service 108 and/or the operator of the server 106. The plurality of potential intents 202 comprises all possible intents which may be associated with a given query by the IPA service 108. The plurality of potential intents 202 comprises potential intents 204, 206, 208, 210 and 212. For example:

the potential intent 204 may be "weather";
the potential intent 206 may be "itinerary";
the potential intent 208 may be "travel";
the potential intent 210 may be "point of interest"; and
the potential intent 212 may be "time-zone time".

It should be understood that the plurality of potential intents 202 may comprise a large number of potential intents such as 100, 1000, 10000, 10000 and the like. As such, the plurality of potential intents 202 may comprise other potential intents to those non-exhaustively listed above without departing from the scope of the present technology.

Each one of the plurality of potential intents 202 is associated with a respective digital-form. For example, the potential intent 204 is associated with a digital-form 214, the potential intent 206 is associated with a digital-form 216, the potential intent 208 is associated with a digital-form 218, the potential intent 210 is associated with a digital-form 220 and the potential intent 212 is associated with a digital-form 222.

Generally speaking, a given digital-form is a computer-implemented algorithm composed of a respective set of program code instructions which, in response to a set of inputs, may be executed and are configured to generate a given intent-specific response for a query that is associated with the corresponding potential intent. Put another way, (i) a given digital-form comprises at least one form-field that may be populated by a given form-value (e.g., a given input for the respective set of program code instructions) and (ii) when the given digital-form is executed, the digital-form may allow generation of the given intent-specific response for a query that is associated with the corresponding potential intent.

It is contemplated that each form-field of a given digital-form is associated with a respective field-parameter which is indicative of a type of form-value that should populate a respective form-field. For example, the digital-form 214 associated with the potential intent 204 "weather", may be include a form-field 224, where the form-field 224 is associated with a given field-parameter "location". This means that, in order to generate a given intent-specific response to a query that is associated with the potential intent 204 "weather", the form-field 224 of the digital-form 214 needs to be populated with a given form-value being of a "location" type.

In another example, the digital-form 216 associated with the potential intent 206 being "itinerary" may include (i) a form-field 226, where the form-field 226 is associated with the field-parameter "location", (ii) a form-field 228, where the form-field 228 is associated with the field-parameter "location" and (iii) a form-field 229, where the form-field 229 is associated with the field-parameter "time". This means that, in order to generate a given intent-specific response to a query that is associated with the potential intent 206 "itinerary", (i) the form-field 226 needs to be populated with a given form-value being of a "location" type, (i) the form-field 228 should be populated with another given form-value being of a "location" type and (iii) the form-field 229 should be populated with a given form-value being of a "time" type.

Indeed, the given form-value for the form-field 226 may establish a departure location for a given itinerary while the other given form-value for the form-field 228 may establish an arrival location for the given itinerary. As such, in this example, the given intent-specific response may be an itinerary from the departure location to the arrival location for the given itinerary. The given form-value for the form-field 229 may establish, for example, a departure time or an arrival time. As such, in this example, another given intent-specific response may be an itinerary from the departure location to the arrival location with a preferred departure time or arrival time.

It should be noted that a given digital-form may have (i) mandatory form-fields and (ii) auxiliary form-fields. The mandatory form-fields are form-fields of a given digital-form that need to be populated with respective form-values in order to generate a given intent-specific response for a query associated with the corresponding potential intent. The auxiliary form-fields are form-fields of the given digital-form that do not need to be populated with respective form-values in order to generate the given intent-specific response but, when populated, may allow generation of a more refined intent-specific response.

With reference to the previous example, the form-fields 226 and 228 of the digital-form 216 associated with the potential intent 206 "itinerary" may be mandatory form-fields while the form-field 229 may be an auxiliary form-field. Indeed, in order to generate a given intent-specific response such as an itinerary from the departure location to the arrival location, the form-field 226 (for establishing the departure location) and the form-field 228 (for establishing the arrival location) are mandatory form-fields of the digital-form 216 since the departure and arrival location are necessary for generating any given itinerary. On the other hand, the form-field 229 (for establishing the departure time or the arrival time) is an auxiliary form-field since it is not required to be populated in order to generate a given itinerary but, if the form-field 229 is populated, a more refined itinerary may be generated.

In some embodiments of the present technology, in order to generate the current intent-specific response for the current query "What's it like in Montreal?", the IPA service 108 is configured to (i) associate the current query with one of the plurality of potential intents 202 stored in the development database 120, thereby determine a current intent of the current query, (ii) populate form-fields of a given digital-form associated with the current intent and (iii) execute the given digital-form, thereby generate the current intent-specific response for the current query.

In order to associate the current query with one of the plurality of potential intents 202 (e.g., determine the current intent of the current query), the IPA service 108 may be configured to employ the first MLA 132 (see FIG. 1) and the second MLA 134. In order to populate form-fields of the given digital-form that is associated with the current intent, the IPA service 108 may be configured to employ the third MLA 136.

Generally speaking, the IPA service 108 may employ the first MLA 132 during its in-use phase for determining a respective intent-association parameter for each one of the plurality of potential intents 202 based on the current query "What's it like in Montreal?" and where a given intent-association parameter is indicative of a probability of the current query being associated with a respective one of the plurality of potential intents 202.

Generally speaking, the IPA service 108 may employ the second MLA 134 during its in-use phase for determining a respective intent-transition parameter for each one of the plurality of potential intents 202 where a given intent-transition parameter is indicative of a probability of a change from the preceding intent "weather" of the preceding query "What is the weather in Moscow?" to a respective one of the plurality of potential intents 202.

As such, by employing the first and the second MLA 132 and 134 during their respective in-use phases, the IPA service 108 may determine, for each one of the plurality of potential intents 202, (i) a respective intent-association parameter and (ii) a respective intent-transition parameter. Based on the respective intent-association and the respective intent-transition parameter of each one of the plurality of potential intents 202, the IPA service 108 may select one of the plurality of potential intents 202 as the current intent of the current query.

Once the current intent of the current query is selected, the IPA service 108 may employ the third MLA 136 during its in-use phase for populating a given digital-form associated with the current intent. Put another way, the third MLA 136 may be configured to associate form-values originating from the conversation 150 and/or other sources with the form-fields of the given digital-form associated with the current intent. The IPA service 108 may also execute the so-populated given digital-form in order to generate the current intent-specific response for the current query.

However, as previously alluded to, prior to employing the plurality of MLAs 130 during their respective in-use phases, each one of the first, second and third MLA 132, 134 and 136 is trained during their respective training phases. The first, second and third MLA 132, 134 and 136 may be trained by the server 106 based on the training data stored in the training database 122.

Figure 3:
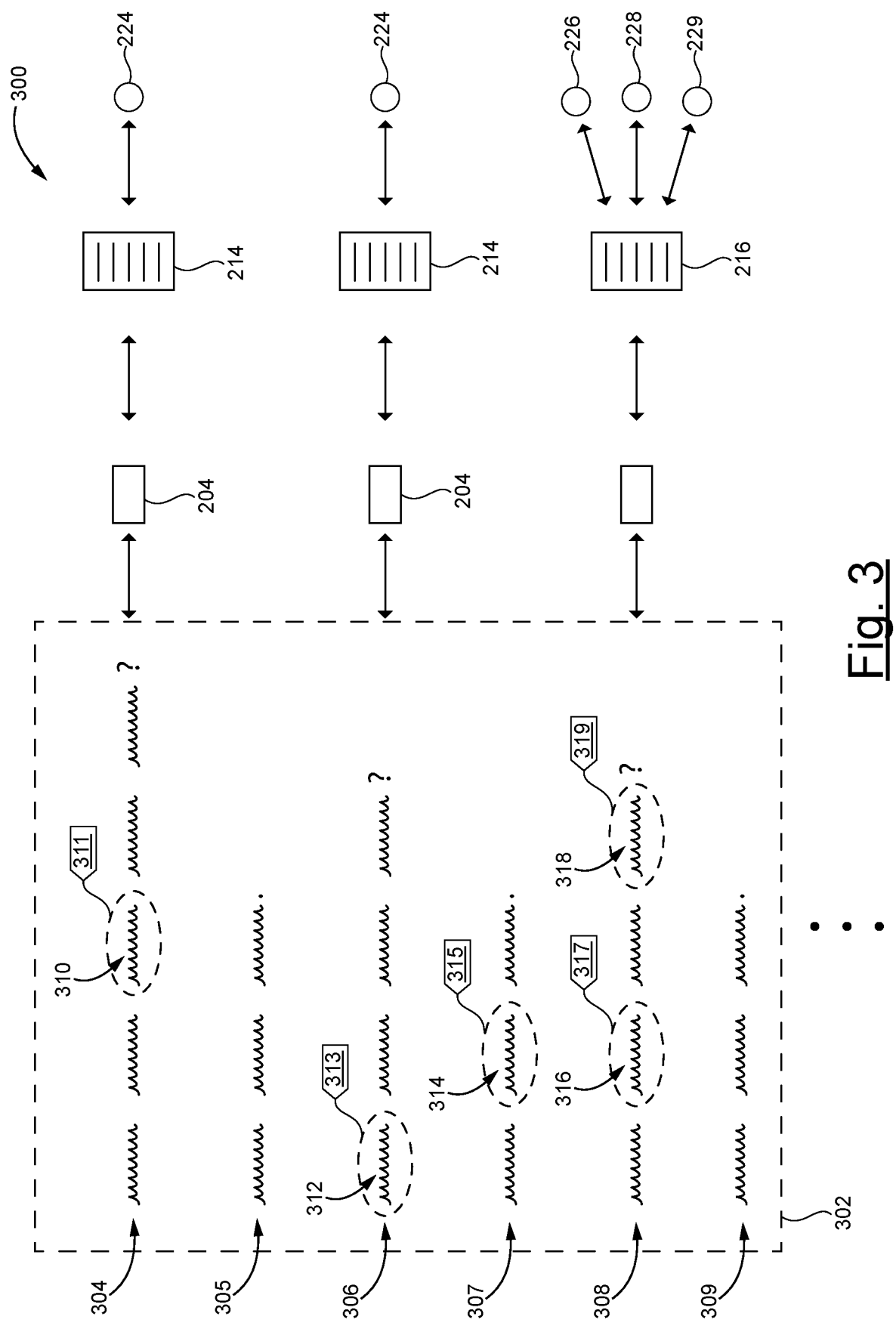
FIG. 3 depicts an illustrative example of training data stored in a training database of the system of FIG. 1 according to some embodiments of the present technology.

With reference to FIG. 3, there is depicted an illustrative example of training data 300 stored in the training database 122 for training the plurality of MLAs 130. The training data 300 comprises data indicative of a past conversation 302. The past conversation 302 comprises respective past queries and respective past responses. For example, the past conversation 302 comprises past queries 304, 306 and 308 and past response 305, 307 and 309 for the past queries 304, 306 and 308, respectively.

It is contemplated however, that data indicative of a large number of past conversations may be stored in the training database 122 along with the data indicative of the past conversation 302. It should be noted that the data indicative of the past conversation may be stored in a text format. In other words, other collections of data relating to past queries and past responses, in addition to the data indicative of the past conversation 302, may be stored in the training database 122 without departing from the scope of the present technology.

The training database 122 may also store human-assessed information that is associated with the one or more collections of data relating to the past queries and the past responses. As previously alluded to, this human-assessed information may be provided by one or more human-assessors that are tasked with analyzing the one or more collections of data relating to the past queries and the past responses, such as data indicative of the past conversation 302.

As part of the human-assessed information, the training database 122 may be configured to store associations between past queries and potential intents, which associations have been determined by the human-assessors. For example, the human-assessors may have determined that:

the past query 304 is associated with the potential intent 204;

the past query 306 is also associated with the potential intent 204; and the past query 308 is associated with the potential intent 206.

Naturally, since each one of the plurality of potential intents 202 is associated with a respective digital-form, associations between past queries and digital-forms may also be stored in the training database 122. As such, it can be said that:

the past query 304 is associated with the digital-form 214;
the past query 306 is also associated with the digital-form 214; and
the past query 308 is associated with the digital-form 216.

As previously mentioned, each digital-form is associated with respective form-fields having respective field-parameters being indicative of types of form-values that should populate the respective form-fields. As such, as part of the human-assessed information, the training database 122 may be configured to store form-value labels associated with portions of the past conversation 302 that identify form-values that human-assessors assessed as being associated with the field-parameters of the digital-forms associated with the past conversation 302.

For example, a portion 310 of the past query 304 is assessed to be associated with a form-value label 311. The form-value label 311 is indicative of the portion 310 being a given form-value that should populate the form-field 224 of the digital-form 214 associated with the past query 304. A portion 312 of the past query 306 is assessed to be associated with a form-value label 313. The form-value label 313 is indicative of the portion 312 being a given form-value that should populate the form-field 224 of the digital-form 214 associated with the past query 306. A portion 314 of the past response 307 is assessed to be associated with a form-value label 315. The form-value label 313 is indicative of the portion 314 being a given form-value that should populate the form-field 226 of the digital-form 216 associated with the past query 308. Portions 316 and 318 of the past query 308 are assessed to be associated with form-value labels 317 and 319, respectively. The form-value labels 317 and 319 are indicative of the portions 316 and 318, respectively, being given form-values that should populate the form-fields 228 and 229, respectively, of the digital-form 216 associated with the past query 308.

How each one of the first, second and third MLA 132, 134 and 136 are trained based on the training data 300 will now be described in turn.

Training of the First MLA

Figure 4:
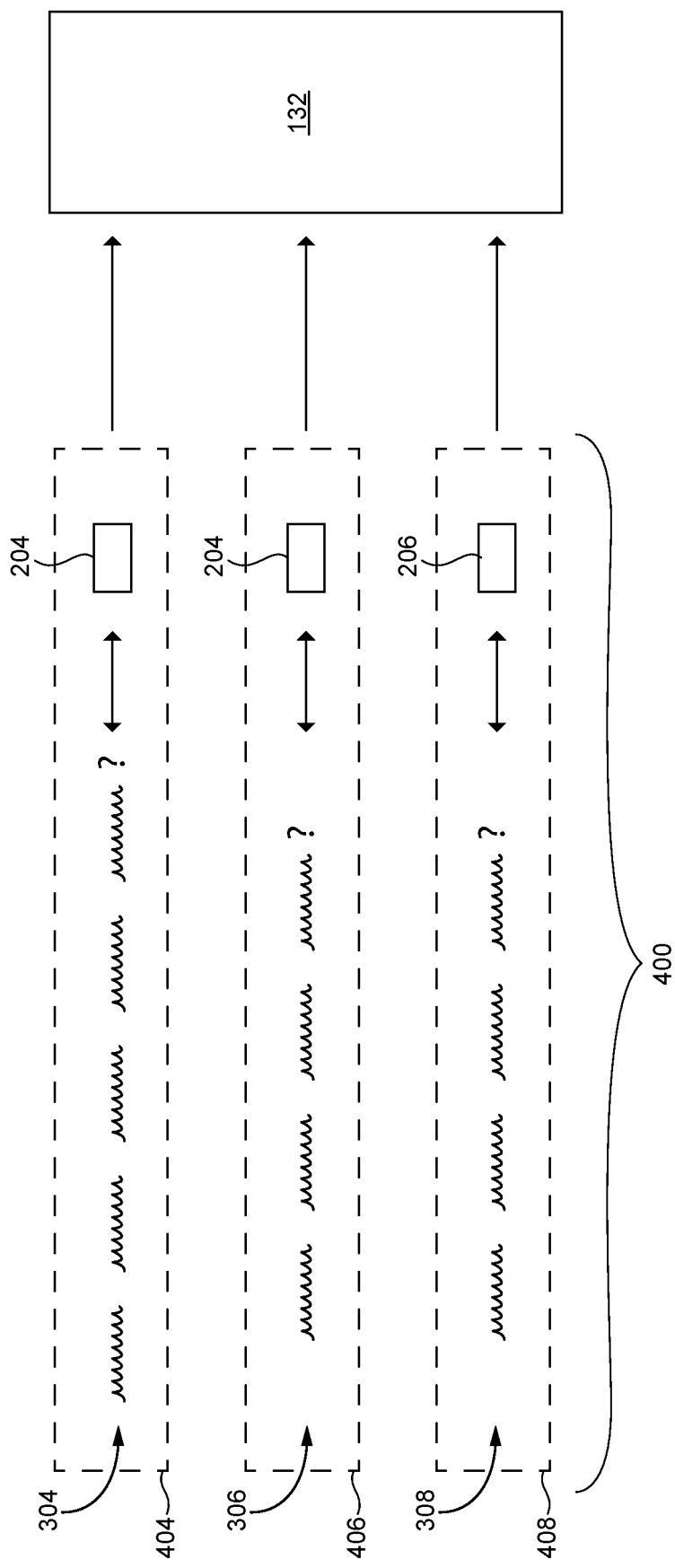
FIG. 4 is a schematic illustration of a training phase of a first machine learning algorithm (MLA) of the system of FIG. 1 according to some embodiments of the present technology.

With reference to FIG. 4, there is depicted a first training sub-set of data 400 that the server 106 may extract from the training data 300 stored in the training database 122 for training the first MLA 132. The first training sub-set of data 400 comprises (i) the past queries 304, 306 and 308 and (ii) associations with respective potential intents having been assessed by the human-assessors. Put another way, in addition to the past queries 304, 306 and 308, the first training sub-set of data 400 comprises (i) the association between the past query 304 and the potential intent 204, (ii) the association between the past query 306 and the potential intent 204 and (iii) the association between the past query 308 and the potential intent 206.

The server 106 is also configured to generate a first, a second and a third training object 404, 406 and 408 for the past queries 304, 306 and 308, respectively, based on the first training sub-set of data 400. For example:

the first training object 404 comprises (i) the past query 304 and (ii) the association between the past query 304 and the potential intent 204;

the second training object 406 comprises (i) the past query 306 and (ii) the association between the past query 306 and the potential intent 204; and the third training object 408 comprises (i) the past query 308 and (ii) the association between the past query 308 and the potential intent 206.

The server 106 is configured to input the first, second and third training object 404, 406 and 408 into the first MLA 132 for training the first MLA 132. Thus, it can be said that the first MLA 132, in a sense, "learns" associations and/or data patterns between (i) characteristics of past queries and (ii)

the respectively associated potential intents. The characteristics of a given past query may include, but are not limited to: the length of the given past query, time of submission of the given past query, user location during submission of the given past query, lexical categories (e.g., noun, verb, adjective and the like) of each word of the given past query, grammatical features of the given past query, semantic features of the given past query and the like.

As a result of the training of the first MLA 132 based on the first, second and third training object 404, 406 and 408 (and other potential training objects for the first MLA 132), the first MLA 132 is trained for determining, based on a given query, the probability of the given query to be associated with each one of the plurality of potential intents 202. Put another way, based on a given query, the first MLA 132 is configured to generate a respective intent-association parameter for each one of the plurality of potential intents 202 being indicative of the respective probability of the respective one of the plurality of potential intents 202 to be associated with the given query.

Training of the Second MLA

Figure 5:
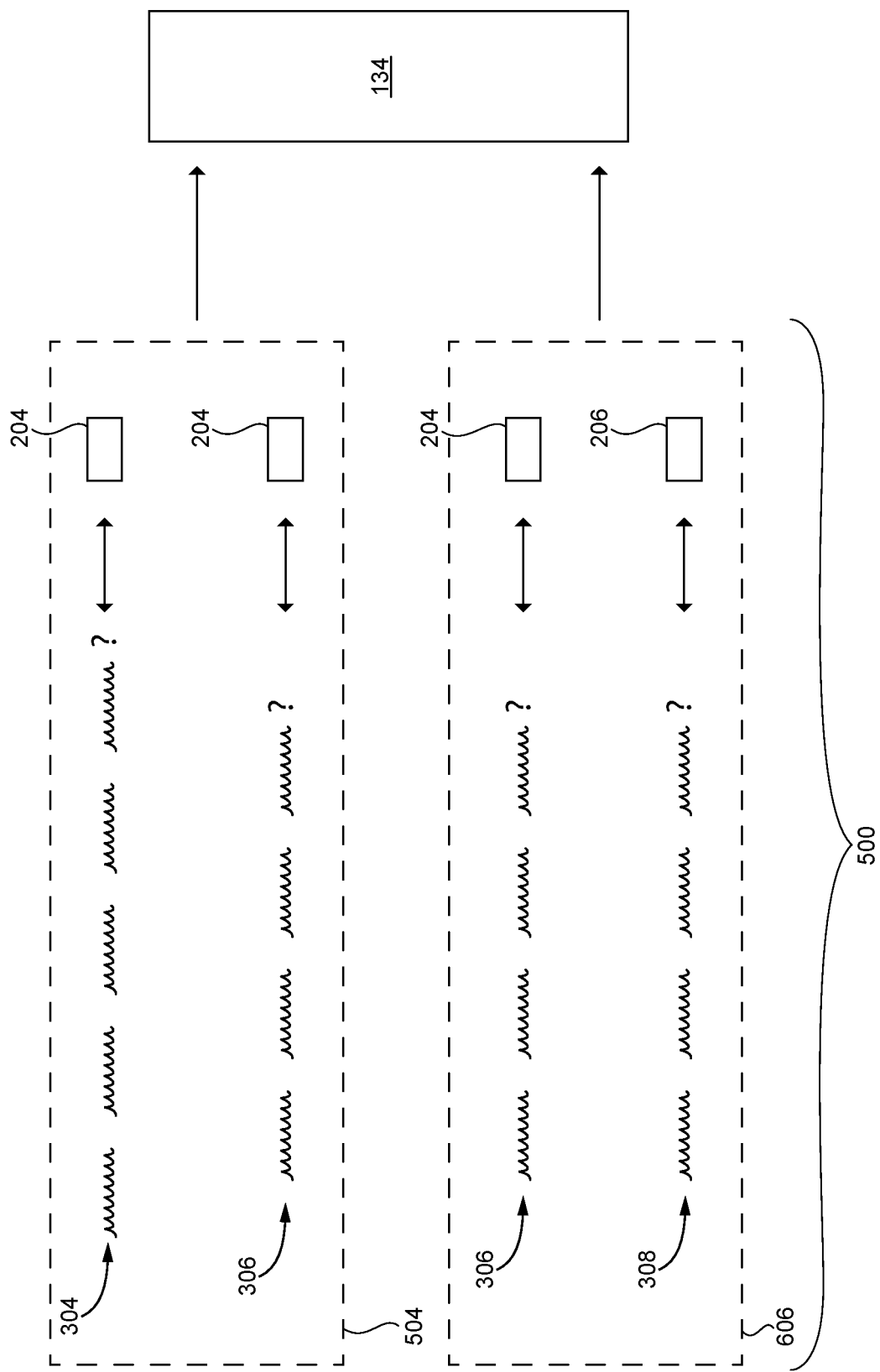
FIG. 5 is a schematic illustration of a training phase of a second MLA of the system of FIG. 1 according to some embodiments of the present technology.

With reference to FIG. 5, there is depicted a second training sub-set of data 500 that the server 106 may extract from the training data 300 stored in the training database 122 for training the second MLA 134. The second training sub-set of data 500 may include the first training sub-set of data 400 and data indicative of "sequentiality" of past queries.

Generally speaking, the data indicative of sequentiality of past queries is indicative of a sequence in which the past queries occurred in a given past conversation. For example, in this case, the data indicative of sequentiality of past queries 304, 306 and 308 in the past conversation 302 is indicative of that (i) the past query 306 is a consecutive query to the past query 304 in the past conversation 302 and (ii) the past query 308 is a consecutive query to the past query 306 in the past conversation 302.

Therefore, the second training sub-set of data 500 comprises (i) the past queries 304, 306 and 308, (ii) the association between the past query 304 and the potential intent 204, (iii) the association between the past query 306 and the potential intent 204, (iii) the association between the past query 308 and the potential intent 206, (iv) the data indicative of that the past query 306 is a consecutive query to the past query 304 in the past conversation 302 and (v) the data indicative of that the past query 308 is a consecutive query to the past query 306 in the past conversation 302. It is contemplated that the second training sub-set of data 500 is also indicative of sequentiality of potential intents associated with the consecutive queries.

The server 106 is also configured to generate a fourth and a fifth training object 504 and 506 for pairs of consecutive past queries, respectively, based on the second training sub-set of data 500. For example:

the fourth training object 504 comprises (i) a first pair of consecutive past queries 304 and 306 (ii) the association between the past query 304 and the potential intent 204 and (iii) the association between the past query 306 and the potential intent 204; and the fifth training object 506 comprises (i) the a second pair of consecutive past queries 306 and 308, (ii) the association between the past query 306 and the potential intent 204 and (ii) the association between the past query 308 and the potential intent 206.

The server 106 is configured to input the fourth and fifth training object 504 and 506 into the second MLA 134 for training the second MLA 134. Thus, it can be said that the second MLA 134, in a sense, "learns" associations and/or data patterns between the characteristics of past queries in respective pairs of consecutive past queries, the respectively associated potential intents and transitions or changes between respectively associated potential intents of respective pairs of consecutive past queries.

As a result of the training of the second MLA 134 based on the fourth and fifth training object 504 and 506 (and other potential training objects for the second MLA 134), the second MLA 134 is trained for determining, based on a given query, the probability of a change from (i) a first one of a given pair of consecutive potential intents of a first one of a respective pair of consecutive queries to (ii) a second one of the given pair of consecutive potential intents of a second one of the respective pair of consecutive queries. Put another way, based on (i) a given pair of consecutive queries and (ii) a given intent associated with the first one of the given pair of consecutive queries, the second MLA 134 is configured to generate a respective intent-transition parameter for each one of the plurality of potential intents 202 being indicative of the respective probability of a change from the given intent associated with the first one of the given pair of consecutive queries to the respective one of the plurality of potential intents 202.

It is contemplated that the second MLA 134 may learn that some transitions or changes of intent between a given previous query and a given current query is highly unlikely to occur. For example, the second MLA 134 may learn that a transition or change of intent between the intent "itinerary" and "weather" may be highly unlikely, and that, irrespective of the pair of consecutive queries.

Training of the Third MLA

Figure 6:
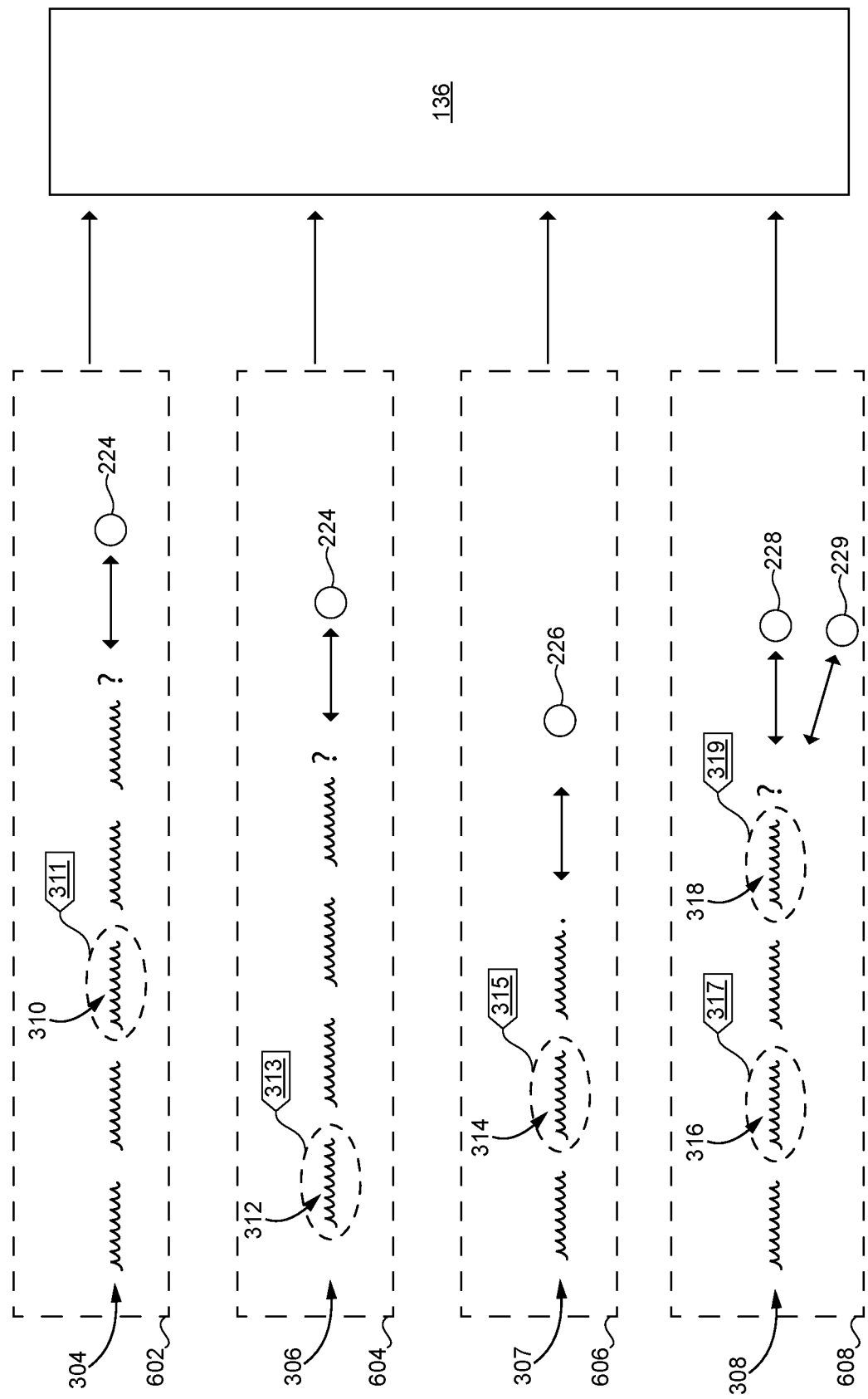
FIG. 6 is a schematic illustration of a training phase of a third MLA of the system of FIG. 1 according to some embodiments of the present technology.

With reference to FIG. 6, there is depicted an illustrative example of a third training sub-set of data 600 that the server 106 may extract from the training data 300 stored in the training database 122 for training the third MLA 136. The third training sub-set of data 600 comprises (i) past queries and/or past responses which comprise portions that have been assessed to be associated with respective form-value labels and (ii) field-parameters of the respective form-fields that should be populated with the respective portions as respective form-values.

In this case, the third training sub-set of data 600 comprises (i) the past query 304 having the portion 310 that has been assessed to be associated with the form-value label 311, (ii) the association between the form-value label 311 and the form-field 224 associated with the respective field-parameter, (iii) the past query 306 having the portion 312 that has been assessed to be associated with the form-value label 313, (iv) the association between the form-value label 313 and the form-field 224 associated with the respective field-parameter, (v) the past response 307 having the portion 314 that has been assessed to be associated with the form-value label 315, (vi) the association between the form-value label 315 and the form-field 226 associated with the respective field-parameter, (vii) the past query 308 having the portions 316 and 318 that have been assessed to be associated with the form-value label 317 and 319, respectively, (viii) the association between the form-value label 317 and the form-field 228 associated with the respective field-parameter and (ix) the association between the form-value label 319 and the form-field 229 associated with the respective field-parameter.

The server 106 is configured to generate a sixth, a seventh, an eighth and a ninth training object 602, 604, 606 and 608 for a respective past query or respective past response, based on the third training sub-set of data 600. For example:

The sixth training object 602 comprises (i) the past query 304 having the portion 310 that has been assessed to be associated with the form-value label 311 and (ii) the association between the form-value label 311 and the form-field 224 associated with the respective field-parameter;

The seventh training object 604 comprises (i) the past query 306 having the portion 312 that has been assessed to be associated with the form-value label 313 and (ii) the association between the form-value label 313 and the form-field 224 associated with the respective field-parameter;

The eighth training object 606 comprises (i) the past response 307 having the portion 314 that has been assessed to be associated with the form-value label 315 and (ii) the association between the form-value label 315 and the form-field 226 associated with the respective field-parameter; and The ninth training object 608 comprises (i) the past query 308 having the portions 316 and 318 that have been assessed to be associated with the form-value label 317 and 319, respectively, (ii) the association between the form-value label 317 and the form-field 228 associated with the respective field-parameter and (iii) the association between the form-value label 319 and the form-field 229 associated with the respective field-parameter.

The server 106 is configured to input the sixth, seventh, eighth and ninth training object 602, 604, 606 and 608 into the third MLA 136 for training the third MLA 136. Thus, it can be said that the third MLA 136, in a sense, "learns" associations and/or data patterns between (i) the characteristics of past queries and/or past responses, (ii) characteristics of the respective portions that have been assessed to be associated with respective form-value labels and (iii) the field-parameters associated with the respective portions.

As previously mentioned, once the plurality of MLAs 130 have been trained, the server 106 may be configured to employ the plurality of MLAs 130, during their respective in-use phases, in order to generate the current response to the current query "What's it like in Montreal?".

Indeed, in order to associate the current query with one of the plurality of potential intents 202 (e.g., determine the current intent of the current query), the IPA service 108 may be configured to employ the first MLA 132 and the second MLA 134. In order to populate form-fields of the given digital-form that is associated with the current intent, the IPA service 108 may be configured to employ the third MLA 136.

In-Use Phase of the First MLA

Figure 7:
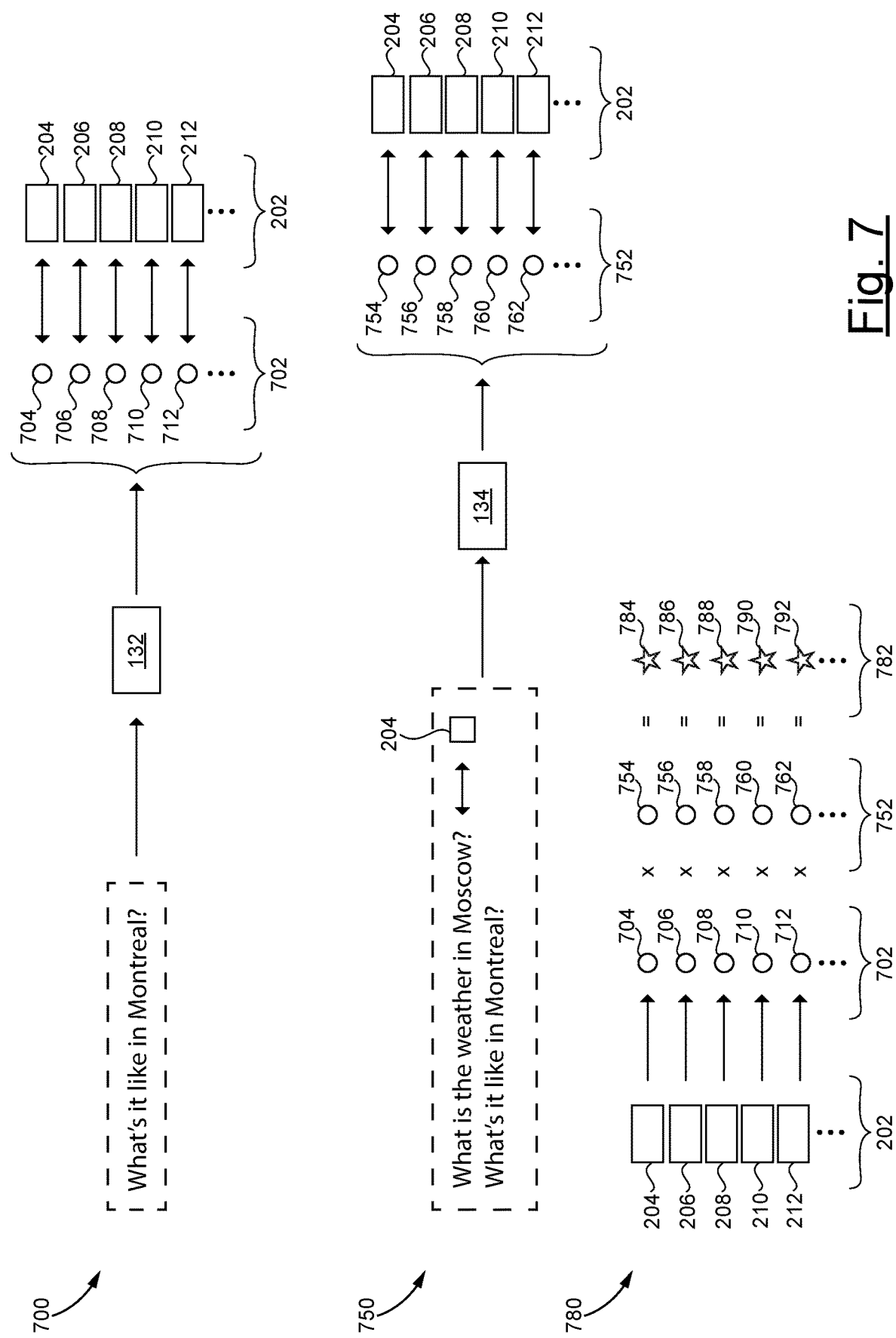
FIG. 7, depicts an illustrative example of an intent-association adjustment procedure according to some embodiments of the present technology.

As previously mentioned, the IPA service 108 may employ the first MLA 132 during its in-use phase for determining a respective intent-association parameter for each one of the plurality of potential intents 202 based on the current query "What's it like in Montreal?". With reference to FIG. 7, there is depicted an illustrative example of an intent-association processing procedure 700 during which the first MLA 132 is employed by the IPA service 108.

During the intent-association processing procedure 700, the current query "What's it like in Montreal?" is inputted into the (now trained) first MLA 132 which outputs a plurality of intent-association parameters 702 associated with the plurality of potential intents 202. It can be said that, based on the characteristics of the current query, the first MLA 132 may output for each one of the plurality of potential intents 202 the probability of the current query to be associated with the respective one of the plurality of potential intents 202. For example:

an intent-association parameter 704 is indicative of the probability of the potential intent 204 to be associated with the current query;

an intent-association parameter 706 is indicative of the probability of the potential intent 206 to be associated with the current query;

an intent-association parameter 708 is indicative of the probability of the potential intent 208 to be associated with the current query;

an intent-association parameter 710 is indicative of the probability of the potential intent 210 to be associated with the current query; and an intent-association parameter 712 is indicative of the probability of the potential intent 212 to be associated with the current query.

It should be noted that each one of the plurality of intent-association parameters 702 being indicative of the probability of the respective potential intent to be associated with the current query has been determined independently from the preceding query "What is the weather in Moscow?" and from the preceding intent "weather" (e.g., the potential intent 204). In other words, the intent-association parameters 702 are indicative of the respective probabilities that do not take into account the preceding query or the preceding intent.

Let it be assumed that the intent-association parameter 708 associated with the potential intent 208 "travel" is superior to any other one amongst the plurality of intent-association parameters 702. This means that, without taking into account the preceding query nor the preceding intent, the current query "What's it like in Montreal?" is most likely to be associated with the potential intent 208 "travel". Indeed, as previously mentioned, taken alone, the current query seems to be referring to a travel destination.

In-Use Phase of the Second MLA

It is contemplated that, once the intent-association parameter 708 is determined, the IPA service 108 may employ the second MLA 134 during its in-use phase for determining a respective intent-transition parameter for each one of the plurality of potential intents 202 based on (i) the preceding query, (ii) the preceding intent and (iii) the current query. With reference to FIG. 7, there is depicted an illustrative example of an intent-transition processing procedure 750 during which the second MLA 134 is employed by the IPA service 108.

During the intent-transition processing procedure 750, the preceding query (i) "What is the weather in Moscow?", (ii) the preceding intent being the potential intent 204 "weather" and (iii) the current query "What's it like in Montreal?" are inputted into the (now trained) second MLA 134 which outputs a plurality of intent-transition parameters 752 associated with the plurality of potential intents 202. It can be said that, based on (i) the characteristics of queries of a pair of consecutive queries comprising the preceding query and the current query and (ii) the preceding intent, the second MLA 134 may output, for each one of the plurality of potential intents 202, the probability of a change from the preceding intent "weather" of the preceding query to a respective one of the plurality of potential intents 202 for the current query. For example:

an intent-transition parameter 754 is indicative of the probability of a change from the preceding intent "weather" of the preceding query to the potential intent 204 for the current query (in this case, it is indicative of a probability of the previous intent and the current intent being the same and that no change has occurred between the previous and the current intents);

an intent-transition parameter 756 is indicative of the probability of a change from the preceding intent "weather" of the preceding query to the potential intent 206 for the current query;

an intent-transition parameter 758 is indicative of the probability of a change from the preceding intent "weather" of the preceding query to the potential intent 208 for the current query;

an intent-transition parameter 760 is indicative of the probability of a change from the preceding intent "weather" of the preceding query to the potential intent 210 for the current query; and an intent-transition parameter 762 is indicative of the probability of a change from the preceding intent "weather" of the preceding query to the potential intent 212 for the current query.

For ease of illustration, if the intent-transition parameter 756 associated with the potential intent 204 "itinerary" is superior to any other one amongst the plurality of intent-transition parameters 752, this means that, by taking into account the preceding query, the preceding intent and the current query, the preceding intent "weather" is most likely to have changed to the intent "itinerary" for the current query.

However, let it be assumed that the intent-transition parameter 754 associated with the potential intent 204 "weather" is superior to any other one amongst the plurality of intent-transition parameters 752. This means that, by taking into account the preceding query, the preceding intent and the current query, the preceding intent "weather" is most likely to not have changed for the current query and that the current intent is most likely to be the same as the previous intent.

In summary, each one of the plurality of potential intents 202 is associated with a respective intent-association parameter and (ii) a respective intent-transition parameter. It is contemplated that the server 106 may be configured to adjust the respective intent-association parameters of the plurality of potential intents 202 by the respective intent-transition parameters. With reference to FIG. 7, there is depicted an illustrative example of a intent-association adjustment procedure 780 during which the server 106 hosting the IPA service 108 is configured to adjust the plurality of intent-association parameters 702 by the plurality of intent-transition parameters.

During the intent-association adjustment procedure 780, the server 106 is configured to determine a plurality of adjusted intent-association parameters 782 for the plurality of potential intents 202. The server 106 may determine a respective adjusted intent-association parameter for each one of the plurality of potential intents 202 as a multiplication of a respective intent-association parameter and a respective intent-transition parameter. For example, the server 106 may determine:

an adjusted intent-association parameter 784 for the potential intent 204 by multiplying the intent-association parameter 704 with the intent-transition parameter 754;

an adjusted intent-association parameter 786 for the potential intent 206 by multiplying the intent-association parameter 706 with the intent-transition parameter 756;

an adjusted intent-association parameter 788 for the potential intent 208 by multiplying the intent-association parameter 708 with the intent-transition parameter 758;

an adjusted intent-association parameter 790 for the potential intent 210 by multiplying the intent-association parameter 710 with the intent-transition parameter 760; and an adjusted intent-association parameter 784 for the potential intent 212 by multiplying the intent-association parameter 712 with the intent-transition parameter 762.

Let it be assumed that the adjusted intent-association parameter 784 is superior to any other one of the plurality of adjusted intent-association parameters 782. In some embodiments of the present technology, the IPA service 108 may be configured to select the potential intent 204 associated with the adjusted intent-association parameter 784 as the current intent of the current query.

In-Use Phase of the Third MLA

As previously mentioned, once the current intent of the current query is selected, the IPA service 108 may employ the third MLA 136 during its in-use phase for populating a given digital-form associated with the current intent. As such, in this case, the IPA service 108 may retrieve the digital-form 214 (see FIG. 2) associated with the potential intent 204, which is selected as the current intent for the current query, from the development database 120 (see FIG. 1).

The server 106 may input the data indicative of the conversation 150 and the field-parameter of the form-field 224 associated with the digital-form 214 into the (now trained) third MLA 136 which, in response, may associate portions of the data indicative of the conversation 150 with the field-parameter of the form-field 224. In this case, the third MLA 136 may associate the portion "Montreal" from the current query with the field-parameter of the form-field 224 since the form-field 224 should be populated with a given form-value that is of a "location" type and "Montreal" is a specific location.

As a result, the server 106 may populate the form-field 224 of the digital-form 214 associated with the potential intent 204 "weather", which is selected as the current intent. The IPA service 108 may execute the so-populated digital-form 214 in order to generate the current intent-specific response "The temperature in Montreal is −15 degrees Celsius and it is sunny" for the current query "What's it like in Montreal?".

In some embodiments of the present technology, the server 106 may generate a data packet 182 (depicted in FIG. 1) comprising data indicative of the current intent-specific response and may transmit it to the device 104 via the communication network 110. Upon reception of the data packet 182, the device 104 generates, based on the data indicative of the current intent-specific response, the sound indication 154 (e.g., a "spoken utterance" of the IPA application 105) and provides or reproduces it for the user 102.

Figure 8:
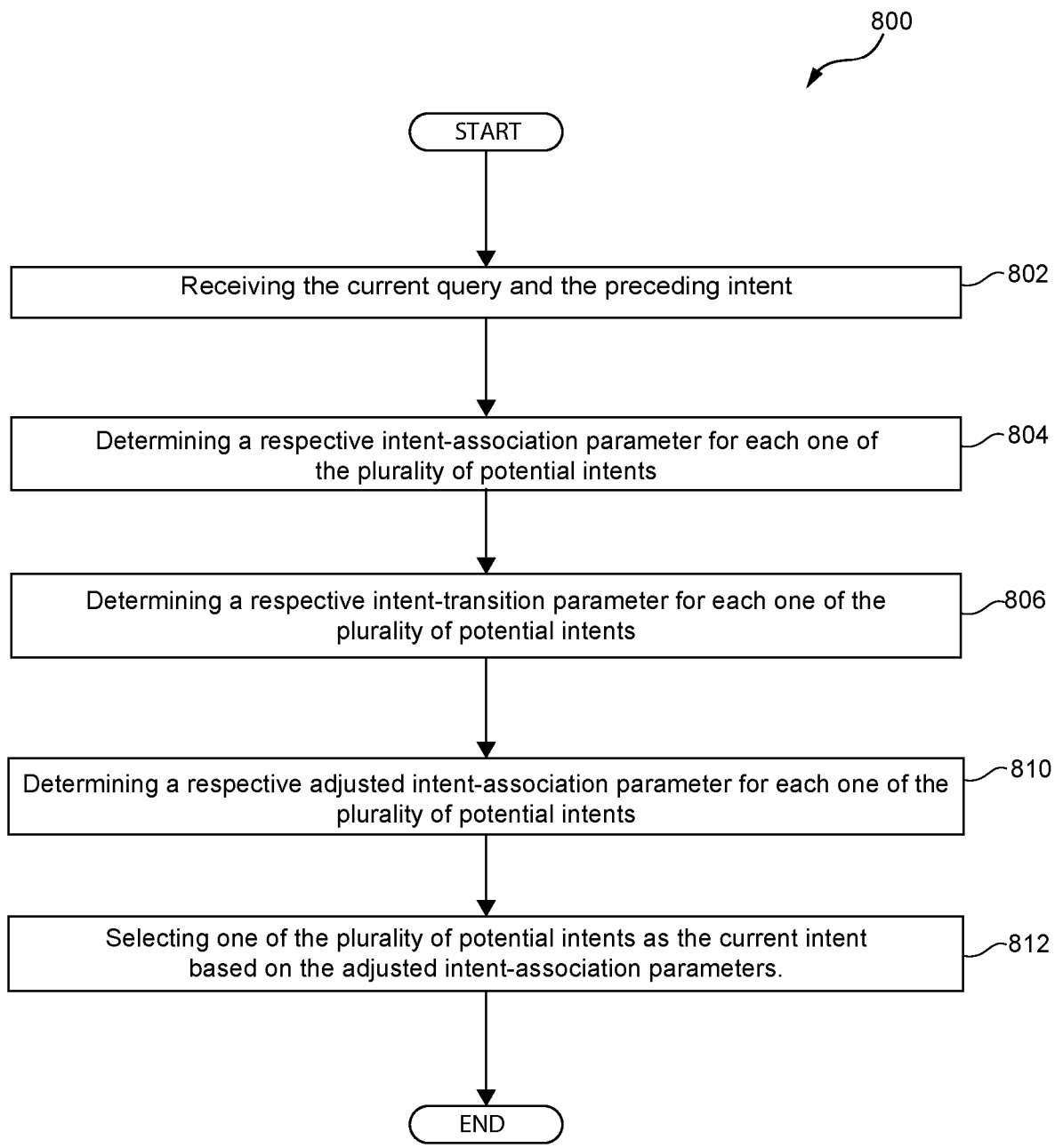
FIG. 8 is a scheme-block illustration of a method of determining a current intent associated with a current query for generating an intent-specific response according to some embodiments of the present technology.

In some embodiments of the present technology, with reference to FIG. 8, the server 106 may be configured to execute a method 800 of determining the current intent associated with the current query of the user 102 for generating the current intent-specific response associated with the current intent for the current query. Although the method 800 may be executed by the server 106, it is contemplated that in other embodiments of the present technology, another computer device, such as the device 104, may be configured to execute at least some steps of the method 800 similarly to how the server 106 is configured to execute the at least some steps of the method 800. The method 800 will now be described in more detail.

STEP 802: Receiving the Current Query and the Preceding Intent

The method 800 being at step 802 with the server 106 being configured to receive the current query and the preceding intent. For example, as depicted in FIG. 1, the server 106 may receive the data packet 180 from the device 104 via the communication network 110.

The data packet 180 comprises data indicative of the current query. In some embodiments, the data packet 180 may comprise the data indicative of the conversation 150, such as data indicative of (i) the preceding query, (ii) the first intent-specific response and (iii) the current query. In yet another embodiment, the data packet 180 may further comprise data indicative of the intent of the preceding query (e.g., "weather").

It is contemplated that since the IPA service 108 may have previously determined, prior to the receipt of the data packet 180, the preceding intent for the preceding query and since the server 106 may have previously stored, prior to the receipt of the data packet 180, the preceding intent in the processing database 124, the server 106 may receive the preceding intent from the processing database 124.

As previously alluded to, at least one of the current query and the preceding query may generated, by the natural language user interface of the IPA application 105, based on spoken-utterances of the user 102 (e.g., sound indications 152 and 156).

STEP 804: Determining a Respective Intent-Association Parameter for Each One of the Plurality of Potential Intents The method 800 continues to step 804 with the server 106 being configured to determine a respective intent-association parameter for each one of the plurality of potential intents 202 (see FIG. 2) based on the current query.

To that end, the server 106 hosting the IPA application 105 may be configured to employ the first MLA 132. With reference to FIG. 3, the first MLA 132 may be trained based on at least some of the training data 300 stored in the training database 122.

In some embodiments, with reference to FIG. 4, the server 106 may be configured to extract the first training sub-set of data 400 from the training data 300. In other embodiments, the first training sub-set of data 400 may have been extracted and stored in the processing database 124 prior to the training phase of the first MLA 132.

The first MLA 132 may be trained by the server 106 based on (i) the past queries 304, 306 and 308 and (ii) respective associated potential intents 204, 204 and 206, where each one of the past queries 304, 306 and 308 have been associated with a given one of the plurality of potential intents by the human-assessor and/or the operator of the server 106.

During the in-use phase of the first MLA 132, the server 106 may be configured to determine the plurality of intent-association parameters 702 (see FIG. 7) based on the current query, where a respective one of the plurality of intent association parameter 702 is associated with a respective one of the plurality of potential intents 202. A given intent-association parameter is indicative of a probability of the current query being associated with a respective one of the plurality of potential intents 202.

It should be noted that each one of the plurality of intent-association parameters 702 being indicative of the probability of the respective potential intent to be associated with the current query has been determined independently from the preceding query "What is the weather in Moscow?" and from the preceding intent "weather" (e.g., the potential intent 204). In other words, the intent-association parameters 702 are indicative of the respective probabilities that do not take into account the preceding query or the preceding intent.

It is contemplated that the plurality of intent-association parameters 702 may be stored in the processing database 124 in association with the current query and the respective ones of the plurality of potential intents 202.

STEP 806: Determining a Respective Intent-Transition Parameter for Each One of the Plurality of Potential Intents The method 800 continues to step 806 with the server 106 being configured to determine a respective intent-transition parameter for each one of the plurality of potential intents 202 (see FIG. 2).

In some embodiments of the present technology, the server 106 may employ the second MLA 134. With reference to FIG. 3, the second MLA 134 may be trained based on at least some of the training data 300 stored in the training database 122.

With reference to FIG. 5, the server 106 may be configured to extract the second training sub-set of data 500 from the training data 300. In other embodiments, the second training sub-set of data 500 may have been extracted and stored in the processing database 124 prior to the training phase of the second MLA 134.

The second MLA 134 may be trained based on (i) pairs of consecutive past queries and (ii) pairs of consecutive potential intents respectively associated with the pairs of consecutive past queries. Each pair of consecutive potential intents may be associated with the respective pair of consecutive past queries by the human-assessor and/or the operator of the server 106.

During the in-use phase of the second MLA 134, the server 106 may be configured to determine the plurality of intent-transition parameters 752 (see FIG. 7) based on (i) the preceding query, (ii) the preceding intent and (iii) the current query, where a respective one of the plurality of intent-transition parameters 752 is associated with a respective one of the plurality of potential intents 202. Each one of intent-transition parameters 752 is indicative of a respective probability of a change from the preceding intent "weather" of the preceding query to a respective one of the plurality of potential intents 202 for the current query.

In alternative non-limiting embodiments of the present technology, it is contemplated that the plurality of intent-transitions parameters 752 may be determined by the server 106 executing a heuristic-based routine, instead of implementing the second MLA 134. For example, the development database 120 may additionally stored an intent-transition table (not illustrated) which comprises respective pre-determined intent-transition parameter for each possible pair of potential intents of the plurality potential intents 202. As such, the heuristic-based routine executed by the server 106 may use a plurality of rules pre-determined by the operator of the server 106 for retrieving appropriate pre-determined intent-transition parameters from the intent-transition table. For example, it is contemplated that some intent-transition parameters can be 0 (not possible) or 1 (possible). Alternatively, it is contemplated that some intent-transition parameters can be on a scale of 0 (not possible) to 1 (highly possible).

It is contemplated that the plurality of intent-transition parameters 702 may be stored in the processing database 124 in association with the current query and the respective ones of the plurality of potential intents 202.

STEP 810: Determining a Respective Adjusted Intent-Association Parameter for Each One of the Plurality of Potential Intents The method 800 continues to step 810 with the server 106 being configured to determine a respective adjusted intent-association parameter for each one of the plurality of potential intents 202 (see FIG. 2).

To that end, the server 106 may be configured to execute the intent-association adjustment procedure 780. During the execution of the intent-association adjustment procedure 780, the server 106 is configured to determine a plurality of adjusted intent-association parameters 782 for the plurality of potential intents 202. The server 106 may determine a respective adjusted intent-association parameter for each one of the plurality of potential intents 202 as a multiplication of the respective intent-association parameter and the respective intent-transition parameter.

In some embodiments of the present technology, the server 106 may be configured to generate a ranked plurality of potential intents (not illustrated) comprising each one of the plurality of potential intents 202 ranked based on the respective ones of the plurality of adjusted intent-association parameters 782.

In other embodiments of the present technology, the server 106 may be configured to compare each one of the plurality of adjusted intent-transition parameters 782 with an association-significance threshold. In response to each one of the plurality of adjusted intent-association parameters being below the association-significance threshold the server 106 may generate a fallback response for the current query instead of the current intent-specific response. The association-significance threshold and the fallback response may be pre-determined by the operator of the server 106.

It is contemplated that the plurality of adjusted intent-association parameters 782 and/or the ranked plurality of adjusted intent-association parameters may be stored in the processing database 124 in association with the current query and the respective ones of the plurality of potential intents 202.

STEP 812: Selecting One of the Plurality of Potential Intents as the Current Intent Based on the Adjusted Intent-Association Parameters The method 800 ends at step 812 with the server 106 being configured to select one of the plurality of potential intents 202 (see FIG. 2) as the current intent for the current query based on the plurality of adjusted intent-association parameters 782. In some embodiments, the server 106 may select select a top ranked potential intent in the ranked plurality of potential intents as the current intent. It is contemplated that the current intent being selected by the server 106 may be stored in the processing database 124 in association with the current query.

In some embodiments of the present technology, the server 106 may receive a given digital-form associated with the current intent from the development database 120.

The server 106 may also be configured to associate a given form-value from the current query with a given form-field of a given digital-form. In some embodiments of the present technology, the server 106 may also be configured to associate another given form-value from the preceding query with another given form-field of the given digital-form. To that end, the server 106 may employ the third MLA 136.

With reference to FIG. 3, the third MLA 136 may be trained based on at least some of the training data 300 stored in the training database 122.

With reference to FIG. 6, the server 106 may be configured to extract the third training sub-set of data 600 from the training data 300. In other embodiments, the third training sub-set of data 600 may have been extracted and stored in the processing database 124 prior to the training phase of the third MLA 136.

The third MLA 136 may be trained based on (i) field-parameters of form-fields of the digital-forms respectively associated with the plurality of potential intents 202 (see FIG. 2), (ii) the past queries and/or past responses and (iii) form-values (portions) from the past queries associated with the field-parameters. The form-values (portions) from the past queries and/or past responses may have been associated with the field-parameters of the digital-forms by the human-assessors.

During the in-use phase of the third MLA 136, the server 106 may be configured to associate form-values (portions) from the current query and/or the preceding query and/or the intent-specific response to the preceding query with the field-parameters and form-fields of the digital-form associated with the current intent in order to populate the corresponding form-fields. The server 106 may populate the form-fields of the digital-form associated with the current intent with the respectively associated from-values. By executing the so-populated digital-form, the server 106 ma generate the current intent-specific response for the current query.

As was alluded to above, the given digital-form may comprises mandatory form-fields and auxiliary mandatory form-fields. The server 106 may generate the current intent-specific response by executing the digital-form associated with the current intent only if all of the mandatory form-fields of the digital-form associated with the current intent are associated with respective form-values.

In some embodiments, if the third MLA 136 did not associate a given form-value (portions) from the current query and/or the preceding query and/or the intent-specific response to the preceding query with a given mandatory form-field of the digital-form associated with the current intent, the server 106 may be configured to populate the given mandatory form-field with data extracted from other sources. For example, if the third MLA 136 did not associate a given form-value (portions) from the current query and/or the preceding query and/or the intent-specific response to the preceding query with a given mandatory form-field of the digital-form associated with the current intent, the server 106 may extract default form-values from the other sources such as, but not limited to, the device 104, the server 106, other web services accessible via the communication network 110 and the like. If a given form-field should be populated with a given form-value being of a "location" type, the server 106 may extract a given default form-value such as a GPS location of the device 104 and populate the given form-field therewith. Similarly, if a given form-field should be populated with a given form-value being of a "time" type, the server 106 may extract a default form-value such as time at which the current query has been submitted by the user 102 and populate the given form field therewith.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of determining a current intent associated with a current query of a user for generating an intent-specific response associated with the current intent for the current query, the user being associated with the current query and a preceding query, the preceding query being associated with a preceding intent, the current and preceding intents being amongst a plurality of potential intents, the method executable by a server, the method comprising:

receiving, by the server, the current query and the preceding intent;

determining, by the server, a respective intent-association parameter for each one of the plurality of potential intents based on the current query, the respective intent-association parameter being indicative of a probability of the current query being associated with the one of the plurality of potential intents;

determining, by the server, a respective intent-transition parameter for each one of the plurality of potential intents, the respective intent-transition parameter being indicative of a probability of a change of the preceding intent to the one of the plurality of potential intents;

determining, by the server, a respective adjusted intent-association parameter for each one of the plurality of potential intents as a multiplication of the respective intent-association parameter and the respective intent-transition parameter;

selecting, by the server, one of the plurality of potential intents as the current intent for the current query based on determined adjusted intent-association parameters; and searching, by the server, at least one source for at least one response to the current query based on the current intent.

2. The method of claim 1, wherein the determining determination of the intent-association parameters is executed by a first machine learning algorithm (MLA) having been trained: based on
(i) past queries and (ii) respectively associated potential intents; and
for determining a probability of a given query to be associated with a given one of the plurality of potential intents, each one of the past queries having been associated with the given one of the plurality of potential intents by a human-assessor.

3. The method of claim 1, wherein determination of the intent-transition parameters is executed by a heuristic-based routine, a plurality of rules to be used by the heuristic-based routine having been pre-determined by an operator.

4. The method of claim 2, wherein determination of the intent-transition parameters is executed by a second MLA having been trained:
based on (i) pairs of consecutive past queries and (ii) pairs of consecutive potential intents respectively associated with the pairs of consecutive past queries; and
for determining a probability of a change from (i) a first one of a given pair of consecutive potential intents of a first one of a respective pair of consecutive queries to (ii) a second one of the given pair of consecutive potential intents of a second one of a respective pair of consecutive queries,
each pair of consecutive potential intents having been associated with the respective pair of consecutive past queries by the human-assessor.

5. The method of claim 1, wherein the method further comprises generating, by the server, a ranked plurality of potential intents comprising each one of the plurality of potential intents ranked based on the respective adjusted intent-association parameter, and wherein the selecting the one of the plurality of potential intent as the current intent comprises selecting, by the server, a top ranked potential intent in the ranked plurality of potential intents as the current intent.

6. The method of claim 1, wherein the method further comprises comparing, by the server, each adjusted intent-association parameter with an association-significance threshold, the association-significance threshold having been determined by an operator of the server, and wherein
in response to each adjusted intent-association parameter being below the association-significance threshold, generating, by the server, a fallback response for the current query instead of the intent-specific response.

7. The method of claim 1, wherein each of the plurality of potential intents is associated with a respective digital-form for generating a respective intent-specific response associated with the potential intent, each digital-form comprising form-fields associated with respective field-parameters.

8. The method of claim 7, wherein the method further comprises associating, by the server, a given form-value from the current query with a given form-field of a given digital-form, the given digital-form being associated with the current intent.

9. The method of claim 8, wherein the given digital-form comprises at least one mandatory form-field associated with a respective field-parameter, and wherein the respective intent-specific response is generated only if all form-fields of the at least one mandatory form-field are associated with respective form-values.

10. The method of claim 8, wherein the associating the given form-value is executed by a third MLA having been trained:
based on (i) field-parameters of form-fields of the digital-forms, (ii) the past queries and (iii) form-values from the past queries associated with the respective field-parameters; and
for associating form-values from the past queries with field-parameters of digital-forms, the form-values from the past queries having been associated with the field-parameters of the digital-forms by a human-assessor.

11. The method of claim 1, wherein at least one of the current query and the preceding query is generated, by a natural language user interface of an intelligent personal assistant (IPA) application, based on spoken utterances of the user.

12. The method of claim 1, wherein the intent-specific response is a spoken utterance for the user generated by a natural language user interface of an intelligent personal assistant (IPA) application.

13. A computer device for determining a current intent associated with a current query of a user for generating an intent-specific response associated with the current intent for the current query, the user being associated with the current query and a preceding query, the preceding query being associated with a preceding intent, the current and preceding intents being amongst a plurality of potential intents, the computer device being configured to:
receive the current query and the preceding intent;
determine a respective intent-association parameter for each one of the plurality of potential intents based on the current query, the respective intent-association parameter being indicative of a probability of the current query being associated with the one of the plurality of potential intents;
determine a respective intent-transition parameter for each one of the plurality of potential intents, the respective intent-transition parameter being indicative of a probability of a change of the preceding intent to the one of the plurality of potential intents;

determine a respective adjusted intent-association parameter for each one of the plurality of potential intents as a multiplication of the respective intent-association parameter and the respective intent-transition parameter;

select one of the plurality of potential intents as the current intent for the current query based on determined adjusted intent-association parameters; and search at least one source for at least one response to the current query based on the current intent.

14. The computer device of claim 13, wherein the computer device is configured to determine the intent-association parameters by executing a first machine learning algorithm (MLA) having been trained:

based on (i) past queries and (ii) respectively associated potential intents; and for determining a probability of a given query to be associated with a given one of the plurality of potential intents, each one of the past queries having been associated with the given one of the plurality of potential intents by a human assessor.

15. The computer device of claim 13, wherein the computer device is configured to determine the intent-transition parameters by executing a heuristic-based routine, a plurality of rules to be used by the heuristic-based routine having been pre-determined by an operator.

16. The computer device of claim 13, wherein the computer device is configured to determine the intent-transition parameters by executing a second MLA having been trained:

based on (i) pairs of consecutive past queries and (ii) pairs of consecutive potential intents respectively associated with the pairs of consecutive past queries; and for determining a probability of a change from (i) a first one of a given pair of consecutive potential intents of a first one of a respective pair of consecutive queries to (ii) a second one of the given pair of consecutive potential intents of a second one of a respective pair of consecutive queries, each pair of consecutive potential intents having been associated with the respective pair of consecutive past queries by the human-assessor.

17. The computer device of claim 13, wherein the computer device is further configured to generate a ranked plurality of potential intents comprising each one of the plurality of potential intents ranked based on the respective adjusted intent-association parameter, and wherein the computer device being configured to select the one of the plurality of potential intent as the current intent comprises the computer device being configured to select a top ranked potential intent in the ranked plurality of potential intents as the current intent.

18. The computer device of claim 13, wherein the computer device is further configured to compare each adjusted intent-association parameter with an association-significance threshold, the association-significance threshold having been determined by an operator of the server, and wherein in response to each adjusted intent-association parameter being below the association-significance threshold, the computer device is further configured to generate a fallback response for the current query instead of the intent-specific response.

19. The computer device of claim 13, wherein each of the plurality of potential intents is associated with a respective digital-form for generating a respective intent-specific response associated with the potential intent, each digital-form comprising form-fields associated with respective field-parameters.

20. The computer device of claim 13, wherein the computer device is further configured to associate a given form-value from the current query with a given form-field of a given digital-form, the given digital-form being associated with the current intent.

* * * * *

UNITED STATES PATENT AND TRADEMARK OFFICE
CERTIFICATE OF CORRECTION

PATENT NO. : 10,860,588 B2  
APPLICATION NO. : 16/022882  
DATED : December 8, 2020  
INVENTOR(S) : Nikolay Andreevich Lyubimov et al.

Page 1 of 1

It is certified that error appears in the above-identified patent and that said Letters Patent is hereby corrected as shown below:

In the Claims

Column 27, Claim 2, Lines 33-34 should read --The method of claim 1, wherein determination of the intent-association parameters is--

Column 28, Claim 5, Line 1 should read --the selecting the one of the plurality of potential intents as--

Column 30, Claim 17, Line 13 should read --the plurality of potential intents as the current intent--

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*